United States Patent [19]

Zurlinden

[11] Patent Number: 4,972,503

[45] Date of Patent: Nov. 20, 1990

[54] METHOD AND APPARATUS FOR DETERMINING AUDIENCE VIEWING HABITS BY JAMMING A CONTROL SIGNAL AND IDENTIFYING THE VIEWERS COMMAND

[75] Inventor: Everett V. Zurlinden, Dunedin, Fla.

[73] Assignee: A. C. Nielsen Company, Northbrook, Ill.

[21] Appl. No.: 391,136

[22] Filed: Aug. 8, 1989

[51] Int. Cl.$^5$ ............................................. H04B 17/00
[52] U.S. Cl. ......................................... 455/2; 455/151; 358/84
[58] Field of Search ................. 455/1, 2, 67, 151, 352; 358/84, 194.1

[56] References Cited

U.S. PATENT DOCUMENTS

| | | | |
|---|---|---|---|
| 3,973,206 | 8/1976 | Haselwood et al. | 455/2 |
| 4,317,213 | 2/1982 | DiLorenzo | 455/1 |
| 4,425,578 | 1/1984 | Haselwood et al. | 455/2 |
| 4,605,958 | 8/1986 | Machnik et al. | 455/2 |
| 4,697,209 | 9/1987 | Kiewit et al. | 455/2 |
| 4,723,302 | 2/1988 | Fulmer et al. | 455/2 |
| 4,792,971 | 12/1988 | Uemura | 358/86 |
| 4,876,736 | 10/1989 | Kiewit | 455/2 |
| 4,890,322 | 12/1989 | Russell, Jr. | 358/86 |

*Primary Examiner*—Gerard R. Strecker
*Assistant Examiner*—Lisa Charouel
*Attorney, Agent, or Firm*—Mason, Kolehmainen, Rathburn & Wyss

[57] ABSTRACT

A method and apparatus for determining the channel of a plurality of predetermined channels to which a remotely controlled receiver is tuned. A viewer transmitter device includes a keyboard for receiving viewer entered selections and a remote transmitter which transmits infrared, ultrasonic, radio frequency or other radiated control signals for each of the viewer selections. A receiver device in a channel detection system receives a signal in the selected transmission medium, and immediately signals a jamming device to broadcast interference which precludes the remotely controlled receiver from identifying and acting upon the transmitted control signal. The receiver device applies the received signal to a processor device that performs a stored program to determine if the received signal corresponds to a transmitted control signal from the viewer transmitter device and, if so, to identify the channel to which the monitored receiver is to be tuned. An associated memory device is used for storing the identified channel reception data. The processor device identifies the user selection and either applies a corresponding control signal to a second transmitter device which transmits a control signal of sufficient strength to overcome the interference, or instructs the jammming device to cease the broadcasting of interfering signals. In either case, the remotely controlled receiver will now receive and implement the viewer selection. The processor device will periodically broadcast a command to the remotely controlled receiver containing the last identified channel data to ensure that a viewer does not manually adjust the channel being viewed.

28 Claims, 5 Drawing Sheets

*PRIOR ART*

NORMAL TRANSMISSION OF HYPOTHETICAL CODE

SERIAL DATA STREAM   REST PERIOD   SERIAL DATA STREAM   REST PERIOD

——— DENOTES SIGNAL FROM REMOTE CONTROLLER

FIG. 4B

JAMMED TRANSMISSION OF HYPOTHETICAL CODE

SERIAL DATA STREAM   NO REST PERIOD   SERIAL DATA STREAM   NO REST PERIOD

——— DENOTES SIGNAL FROM REMOTE CONTROLLER
- - - - - DENOTES INTERFERING SIGNAL FROM SSJR

METHOD AND APPARATUS FOR DETERMINING AUDIENCE VIEWING HABITS BY JAMMING A CONTROL SIGNAL AND IDENTIFYING THE VIEWERS COMMAND

BACKGROUND OF THE INVENTION

A. Field of the Invention

This invention relates generally to a method and apparatus for monitoring and controlling a remotely controlled receiver to determine the channel to which the remotely controlled receiver is tuned to thereby determine audience preferences.

B. Description of the Prior Art

Various arrangements have been employed to determine audience preferences and viewing habits of television and other audiences. These systems monitor the channel to which a television receiver is tuned, whether the receiver is on or off, and in some instances, whether the receiver is receiving a broadcast program, a cable or satellite program or a program played back from a VCR. A disadvantage of many known monitoring arrangements is that an internal connection to the television receiver is required. For example, U.S. Pat. No. 3,973,206 issued to Haselwood et al, on Aug. 3, 1976 discloses a method of determining channel tuning by monitoring the varactor diode tuning voltage and thus, requires internal connections in the television receiver.

Another method for determining channel tuning disclosed in U.S. Pat. No. 4,425,578 issued to Haselwood et al on Jan. 10, 1984 utilizes a signal injection source and a detector/receiver arranged to detect the combined signal from the injection signal source and a video carrier to which the video receiver is tuned. A significant drawback of signal injection monitoring arrangements is the potential interference with the functional operation of the video receiver being monitored.

U.S. Pat. No. 4,723,302 to Fulmer et al, issued Feb. 2, 1988 and assigned to the same assignee as the present application, discloses another method for determining channel tuning utilizing a local oscillator frequency measurement of the monitored receiver. The disclosed method and apparatus while effective for its intended purpose generally requires that a probe be positioned at a selected location in the monitored receiver and thus requires physical access to the receiver.

U.S. Pat. No. 4,697,209 to Kiewit et al, issued Sept. 29, 1987 and assigned to the same assignee as the present invention, discloses another method and apparatus for determining channel tuning. This method involves intrusively monitoring the ON/OFF states of a television receiver and a VCR, extracting a signature from a video signal, and comparing the signature comparing with a reference signature to determine the tuned channel.

Access to the tuning mechanism is becoming increasingly difficult with the advent of cable and pay television systems that utilize various converters and decoders, many of which are difficult to access. U.S. Pat. No. 4,876,736 also to Kiewit filed on Sept. 23, 1987 and assigned to the same assignee as the present invention, discloses a method and apparatus for monitoring the status of a remotely controlled television tuner by interposing a translating and logging device between the television tuner and a special remote controller supplied to the user. The translating and logging device receives the signals from the special controller, logs them, translates them from the format used by the special controller into a format acceptable by the television tuner, and retransmits the translated signals to the television tuner. This system allows channel monitoring without physical access to the receiver but has the disadvantage that the user must give up the user's own remote controller in favor of the special controller, which may or may not have the special features which the user desires.

SUMMARY OF THE INVENTION

It is an object of the present invention to provide a method and apparatus for identifying audience viewing habits that overcome many of the disadvantages of the prior art.

It is another object of the present invention to provide a non-invasive method and apparatus for determining audience viewing habits.

It is another object of the present invention to provide a method and apparatus for determining audience viewing habits in which the viewer utilizes the viewer's existing remote control device.

It is yet another object of the present invention to provide method and apparatus which jams reception of a remote control signal while identifying audience viewing habits, then ceases jamming so that the remote control signal can be received.

It is another object of the present invention to provide method and apparatus for identifying audience viewing habits which interferes with the reception of a remote control signal, and, after identifying audience viewing habits, retransmits an equivalent control signal.

In brief, these and other objects and advantages of the invention are provided by a method and apparatus for determining the channel of a plurality of predetermined channels to which a remotely controlled receiver is tuned. An audience member transmitter device includes a keyboard or other interface for receiving viewer entered selections and a remote transmitter which transmits infrared, ultrasonic, radio frequency or other radiated control signals for each of the viewer tuning and ON/OFF selections. A receiver device in a channel detection system receives a signal in the selected transmission medium, and immediately signals a jamming device to broadcast interference which precludes the remotely controlled receiver from identifying and acting upon the transmitted control signal. The receiver device applies the received signal to a processor device that performs a stored program to determine if the received signal corresponds to a transmitted control signal from the viewer transmitter device and, if so, to identify the channel to which the monitored receiver is tuned. An associated memory device is used for storing the identified channel reception data. The processor device identifies the user selection and either applies a corresponding control signal to a second transmitter device which transmits a control signal of sufficient strength to overcome the interference, or instructs the jamming device to cease the broadcasting of interfering signals. In either case, the remotely controlled receiver will now receive and implement the viewer selection. The processor device will periodically broadcast a command to the remotely controlled receiver containing the last identified channel data to ensure that a viewer does not manually adjust the channel being viewed.

DESCRIPTION OF THE DRAWING

These and other objects and advantages of the present invention will become readily apparent upon consideration of the following detailed description and attached drawings wherein.

DETAILED DESCRIPTION OF THE PREFERRED EMBODIMENT

Figure 1:
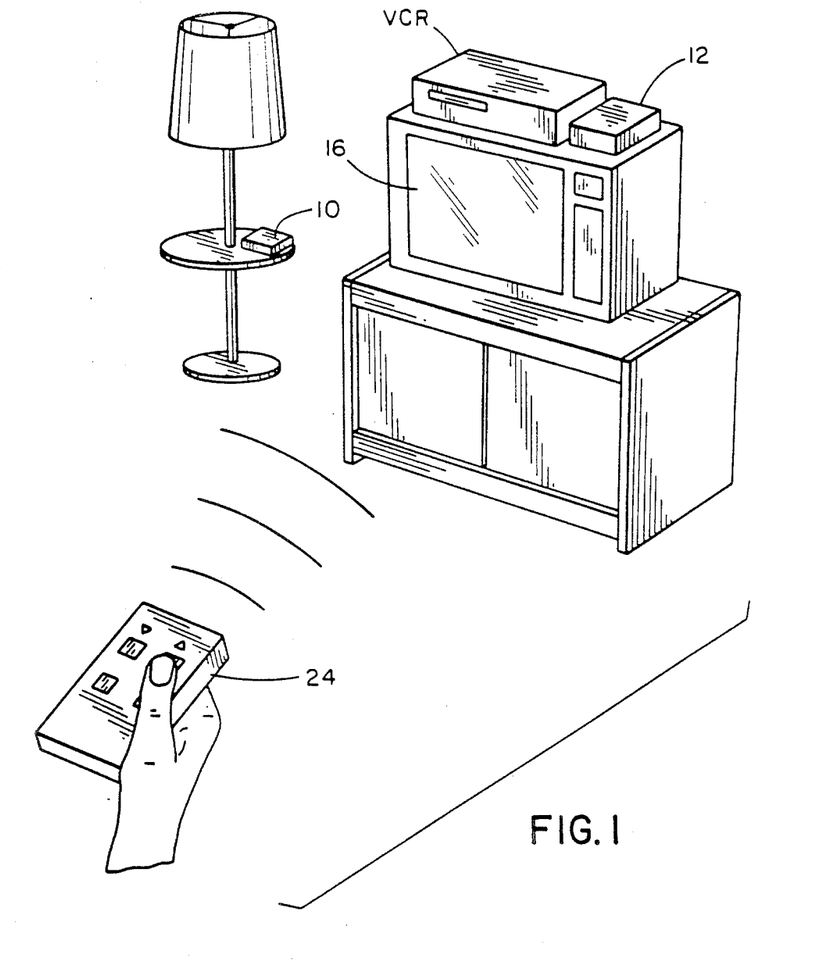
FIG. 1 illustrates a remote control receiver, channel detection apparatus, a VCR, and a television display with a remote control receiver in accordance with the present invention.
Figure 2:
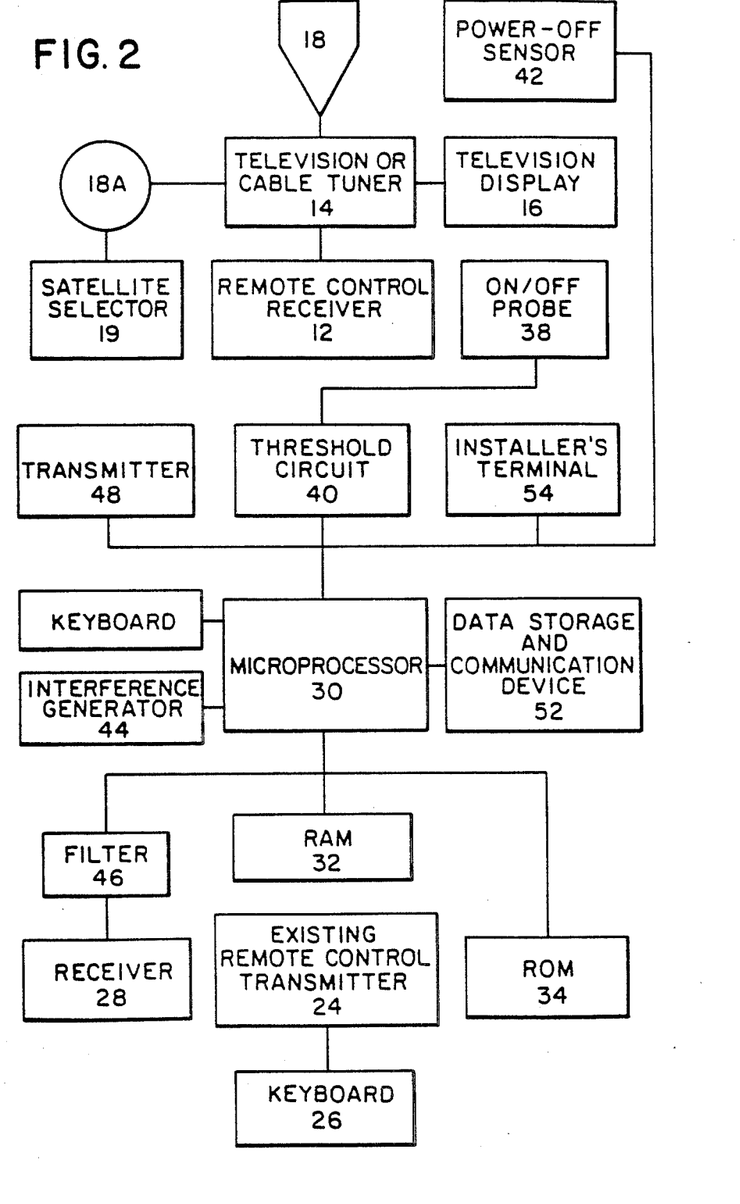
FIG. 2 is a block diagram of the channel detection apparatus according to FIG. 1.

Referring now to FIG. 1 and 2, there is illustrated a new and improved channel detection apparatus according to the invention generally designated by the reference numeral 10. While the channel detection apparatus 10 is depicted and generally described herein for monitoring a television receiver, the principles of the present invention are also applicable to broadcast radio receivers, video cassette recorders and other receivers. Additionally, the invention is discussed in terms of remote control transmitters which modulate an infrared light source such as one having a 40 KHz carrier signal but is equally applicable, but not limited, to other infrared carrier signals and to remote control transmitters using other transmission mediums such as ultrasound, radio frequency waves or other radiated waves.

In a non-monitored remotely controlled television system, an existing viewer remote control transmitter 24 having a keyboard 26 generates and transmits control signals based on viewer keyboard selections. A remote control receiver 12 receives the transmitted control signals and responds to the received control signals to control a tuner 14 that may be an internal television tuner, an external cable tuner such as is shown in FIG. 1, or a tuner in an external device such as a VCR, or any other device conventionally used in conjunction with a television display 16. A signal source 18 is connected to the television tuner 14, such as, for example, a receiving antenna or a television cable system. Alternatively, a satellite antenna 18A used in conjunction with a satellite selector 19 provides a selected broadcast satellite signal to the television tuner 14. The satellite selector 19 is controlled by the remote control receiver 12 for aiming the satellite antenna 18A at a particular one of a plurality of broadcasting satellites.

During normal monitoring operation of the channel detection apparatus 10 of the present invention, a remote control receiver 28 of the channel detection apparatus 10 receives the transmitted control signals from the transmitter 24, and passes the control signal to a processor device such as a microprocessor 30 having a random access memory RAM 32 for data storage, and a read only memory ROM 34 for program storage. If desired, a conventional ON/OFF probe 38 may be used for monitoring the ON/OFF operational modes of the monitored television including the tuner 14 and the display 16. An ON/OFF threshold circuit 40 is used in conjunction with the ON/OFF probe 38 to provide a signal to the microprocessor 30 corresponding to the ON and OFF operational functions of the television 16. A power-off probe 42 of the channel detection apparatus 10 provides a signal to the microprocessor 30 indicative of the monitored television tuner 14 being disconnected from the power source or other power outage.

When the television is turned ON after power is restored to the monitored tuner 14, a default channel is initially tuned by the tuner 14. Thus, the signal of power-off probe 42 is utilized by the microprocessor 30 to accurately identify this initial channel reception.

Included in the channel detection apparatus 10 is an interference generating device 44 which generates and transmits signals, described later in greater detail, in the same transmission medium as the viewer's remote control transmitter 24. While this interference generating device 44 can produce signals at the same frequency as the viewer's remote control transmitter 24, in practice it is advantageous to use a different known frequency which is twice the carrier signal as the interfering or jamming frequency. In the specific embodiment discussed, this is an interfering frequency of 80 KHz. This allows a filter 46 to be added to the receiver 28 of the channel detection apparatus 10 which can separate the control signal from the interfering signal so that the control signal can be analyzed. Alternatively, since the control signal is not acted upon by the remote control receiver 12 until verified by the reception of multiple redundant control signal transmissions, jamming of the control signal can be delayed until the channel detection apparatus 10 has received the initially transmitted control signal for analysis. Once the initial transmission is received, the remaining redundant control signal transmissions will thereafter be jammed. The remote control receiver 12 generally will require 6, 8 or 10 redundant transmissions of the remote control signal, the exact number of which depends on the manufacturer's specifications and the environment in which the system is located. Since the redundant transmissions after the initial transmission are interfered with and the requisite number of redundant transmissions are not received, the remote control receiver 12 will be unable to verify the accuracy of the initially transmitted remote control signal, and thus unable to implement the viewer commands encoded in that remote control signal.

The channel detection apparatus 10 also includes a remote control transmitter 48 coupled to the microprocessor 30 for transmitting control signals in the format of the viewer's remote control transmitter 24 for controlling the tuner 14. Ideally, the remote control transmitter 48 of the channel detection apparatus 10 has the capacity to transmit remote control signals with much greater power than the viewer's remote control transmitter 24, enabling the remote control transmitter 48 to broadcast control signals to the remote control receiver without having to be in a line of sight. Although the interference generating device 44 and the remote control transmitter 48 are described herein as separate devices, these devices are similar in function and can be combined into a single device, if desired.

The channel detection apparatus 10 further includes a keyboard 50 coupled to the microprocessor 30 for manual operation by the viewer. The microprocessor keyboard 50 is used instead of an existing television tuner keyboard (not shown) typically included with the television tuner 14 because, as will be described in further detail below, manual control of the television tuner 14 via the existing keyboard is discouraged. In response to a viewer entry made by way of the microprocessor keyboard 50, the microprocessor 30 applies the corresponding control signals to the transmitter 48 for controlling the tuner 14. The channel reception is identified for a viewer selection entry via keyboard 50 by the same logical steps performed by the microprocessor 30 as for an entry via transmitter 24.

A data storage and communication device 52 takes the data from the microprocessor 30 via one of various known communication methods and stores the data for subsequent retrieval, usually via a telephone line connected to the public switched telephone network, work, by a central computer (not shown). A terminal 54 is coupled to the microprocessor 30 for use during the installation procedure and for testing.

Figure 3A:
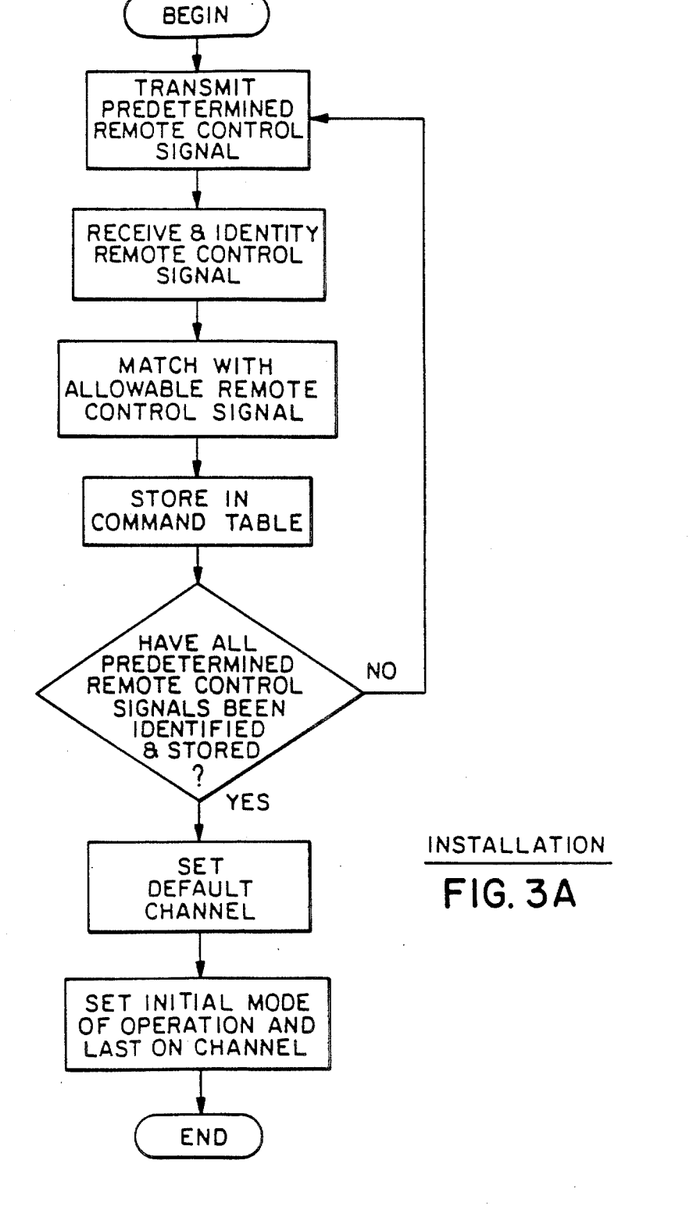
FIGS. 3A–3B are flow charts illustrating the logical steps performed by the apparatus of FIG. 1 and 2.

The operation of the channel detection apparatus 10 will now be described with reference to the flow charts shown in FIGS. 3A-3B. Referring first to FIG. 3A, the logical steps performed by the channel detection apparatus 10 during an initialization procedure are illustrated. The initialization procedure includes sequentially correlating and storing corresponding viewer selections in the microprocessor 30 of the existing user transmitter 24 and the allowed user functions for each possible viewer selection. A first predetermined control signal is transmitted by the existing remote control transmitter 24 and is received and stored by the receiver 28 and microprocessor 30 of the channel detection apparatus 10. The stored predetermined control signal is matched to and stored with a corresponding allowed signal as originally determined by an operator at installer terminal 54. The corresponding allowed signal will be the same as the stored predetermined control signal in most cases, but can be varied to a different predefined control signal format for each of the commands that may be received by the television receiver. Whether the predetermined remote control signal and its corresponding allowed control signal are identical will generally depend on whether the channel to be displayed by the television receiver can be determined by the channel detection apparatus 10 from the viewer selection information contained in the predetermined control signal. Where the channel to be displayed cannot be determined by monitor 10, an allowable control signal as similar as possible in function will be substituted for the predetermined remote control signal. The corresponding control signal pairs are then sequentially stored by the microprocessor to form a command table.

As an example of the predetermined control signal differing from the allowable control signal, some remote controllers offer channel scan, where an up or down command is continuously transmitted to the tuner until the viewer finds an acceptable channel. This example represents the most difficult scenario in the operation of the monitoring device for its intended data collection task. In channel monitoring, it is necessary to know which station the TV set is tuned to at all times. This task is normally a straightforward task for the monitor, since the monitor 10 simply watches for the channel number to be broadcast as the user selects the channel and then stores the channel number in memory. The up/down arrows present a difficult challenge since the data rate is totally random due to irregularities in the transmission caused by such factors as transmission angle and signal strength and because the monitor 10 is not synchronized to the number of redundant transmissions required by the remotely controlled receiver 12 to verify accurate command reception. Therefore, the monitor 10 cannot know what channel was finally chosen. The technique described in this application solves this problem by jamming the transmission thus causing the target receiver 12 to ignore the transmitted code. The monitor 10 then proceeds to add or subtract one from the current channel number as determined by which directional arrow was transmitted and display the new channel on the monitor's display. Once the audience member has decided which channel to watch, the monitor 10 will then broadcast the absolute channel number to the target receiver 12 assuring that the monitor 10 always knows the channel to which the remotely controlled receiver 12 is tuned.

The installation procedure is continued until all possible viewer commands including commands from the keyboard 50 as well as from the existing remote control transmitter 24 are identified and allowable commands are substituted for any viewer command which might prevent the channel detection device 10 from monitoring the target receivers' 12 channel. At the end of the installation procedure, the default channel tuned by the tuner 14 after a power loss is identified and stored. Then one of the predetermined channels of the tuner 14 is entered as a viewing selection and that channel is stored as the last on channel. Finally, the monitoring mode of the channel detection apparatus 10 is selected and the initialization procedure is completed.

Figure 3B:
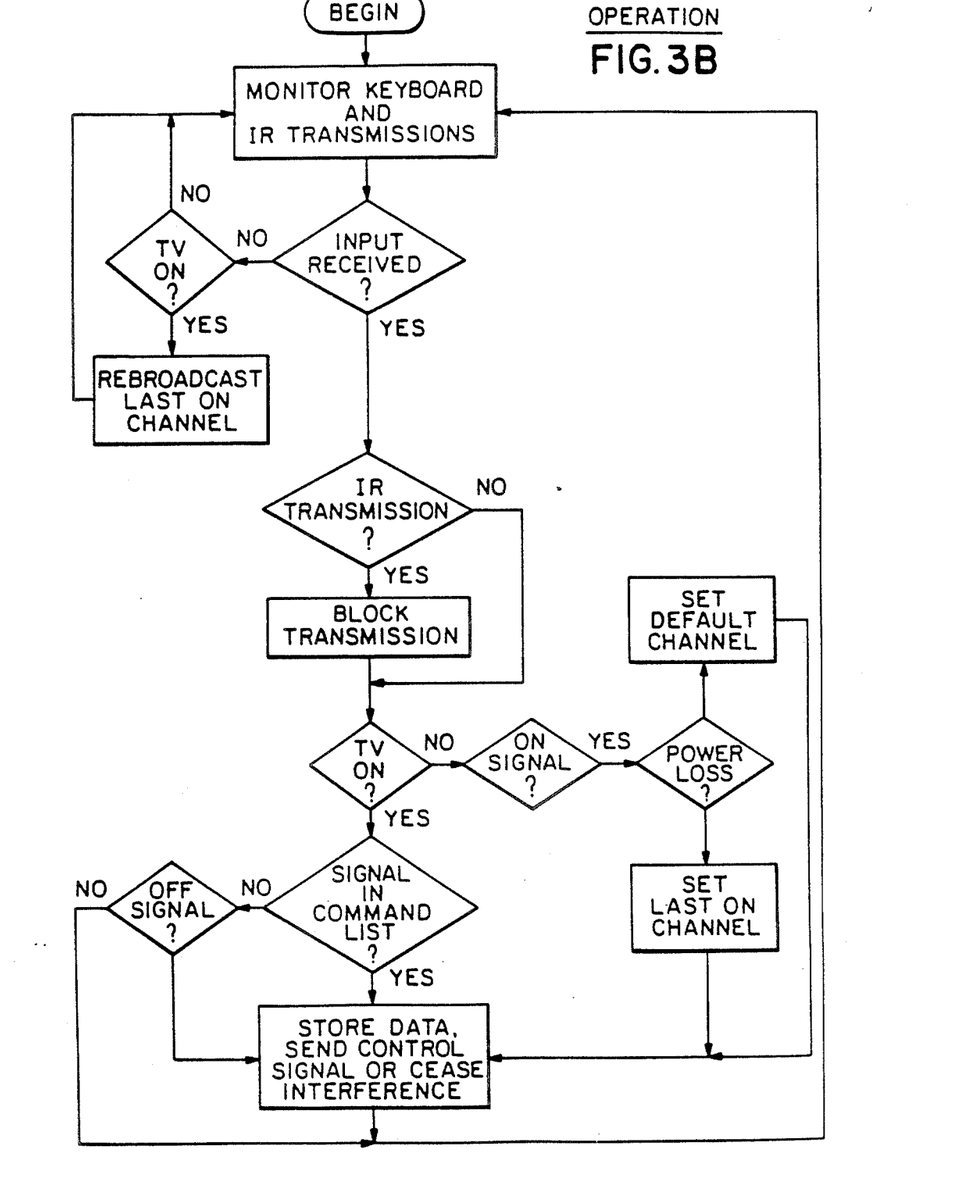

Referring to FIG. 3B, there is illustrated the logical steps performed during the monitoring operation by the channel detection apparatus 10. For purposes of the illustrated example, infrared (IR) transmissions are assumed.

The microprocessor 30 is constantly monitoring the signals from both the remote control receiver 28 and the keyboard 50 to identify viewer selections. When any signal is received by remote control receiver 28, the microprocessor 30 instructs the interfering device 44 to interfere with the signal so received. The interfering device 44 will immediately begin to transmit interfering signals which render any remote control signals being transmitted to the television receiver 12 unidentifiable.

Figure 4A:
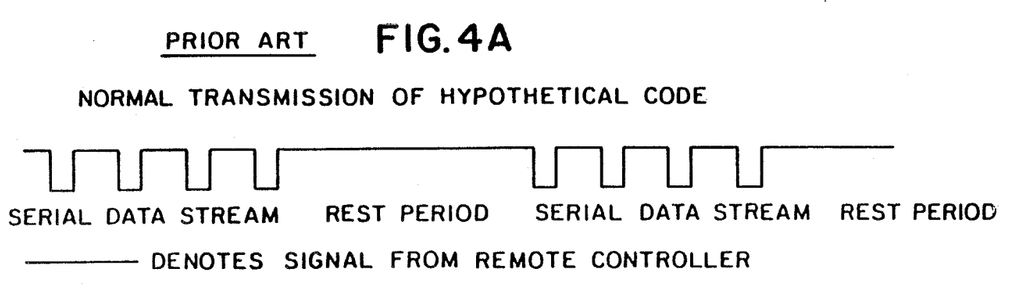
FIGS. 4A–4B are examples of normal and interfered with transmissions of hypothetical serial data.
Figure 4B:
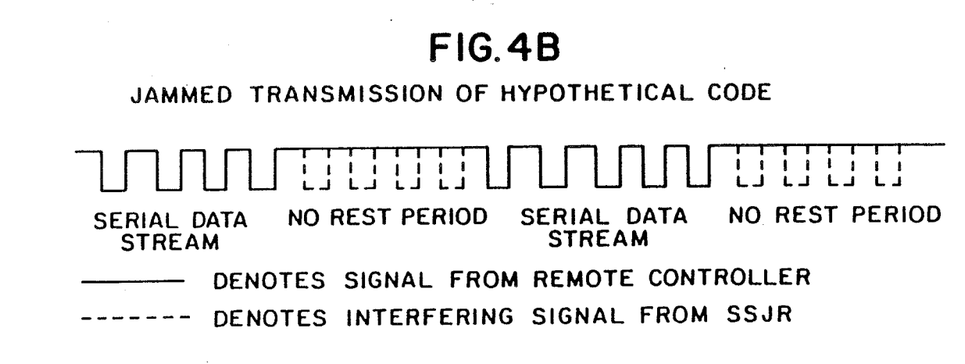

As shown in FIGS. 4A and 4B, the invention renders transmissions unintelligible by filling in the gaps between serial data groupings with interfering signals. The elimination of rests or spaces in the serial data alters the control format of the transmitted signal to a format which cannot be matched, identified or decoded by the target device 12. Alternatively, a continuous interference signal can be generated by the jamming device 44 which would also render the transmission unintelligible by preventing the reception of any data bits.

In general, the interference will be in the same transmission medium but at a different known frequency than the user's control signal. This allows the channel detection apparatus 10 to filter the specific frequency of the interfering signal with filter 46 and then read the user command from the user control signal. For example, most infrared remote controllers in use today modulate infrared transmissions with a 40 KHz signal. The interfering device jams such a signal with an 80 KHz signal which can subsequently be filtered. The interfering device, of course, can jam the transmission with the same frequency of signal as being transmitted. However, as previously described, the initiation of the interfering signal must then await the microprocessor's 30 reception of an unjammed signal prior to commencing interference generation.

Returning to FIG. 3B, when a signal in the transmission medium is detected, jamming commences and the microprocessor 30 monitors the ON/OFF signal applied by the ON/OFF threshold circuit 40 to determine if the television is ON or OFF.

When the television is OFF, the detected signal is compared with the stored turn ON signal of the transmitter 24 or the keyboard 50 depending on the source of the detected signal. When a match is found corresponding to an entered turn ON selection by the viewer, the microprocessor 30 monitors the power-off probe 42 to determine if a power loss has occurred prior to the detected turn ON selection. When a power loss to the monitored receiver is indicated, the channel reception is set to the stored power-off default channel. Otherwise, when a power loss is not indicated, the channel reception is set to the stored last on channel. The corresponding stored turn ON signal of the transmitter 24 is then applied by the microprocessor 30 to the transmitter 48 for transmitting to the remote control receiver 12. Otherwise, when the compared signals do not match, the received signal is interfered with until it ceases.

When the television is ON, the detected signal is compared with the stored command signals of the transmitter 24 or the keyboard 50 of the command table. When a match is found, the stored corresponding signal of the transmitter 24 is applied by the microprocessor 30 to the transmitter 48 for transmitting the corresponding control signal through the interference to the remote control receiver 12. Alternatively, the microprocessor 30 can instruct the interfering device 44 to cease interference and allow the remotely controlled receiver 12 to unimpededly receive the remote control signal. The current channel being viewed is then stored as the last on channel.

When a match is not found in the command table, the detected signal is jammed until it ceases but is otherwise ignored.

To ensure that the channel detection apparatus 10 stays abreast of the channel being watched by the viewer, the channel detection apparatus will periodically rebroadcast a remote control signal to the remotely controlled receiver 12, instructing the remote receiver 12 to tune the television to the last on channel stored by the channel detection apparatus 10. This rebroadcast period can range from a period of several seconds to a period of several minutes in length, and is intended to discourage the manual bypass of the remote control transmitter 24 at the television tuner 14 itself by continuously resetting the television display 16 to the channel which the monitor 10 has last recorded. This has the advantage of encouraging the viewer to use the remote controller transmitter 24, while ensuring that the channel actually being viewed is the channel which is being recorded as on by the monitor 10.

In another embodiment, the interfering device permanently interferes with any transmissions in the transmission medium by broadcasting continuous interference at a known frequency which differs from that of the existing remote control transmitter 24. The receiver 28 of the channel detection apparatus 10 filters this known frequency and monitors signals received in the filtered transmission medium. Any signals so received are treated as described above and either relayed to remote control receiver 12 with great power, or the generation of interference is halted long enough for the signal from transmitter 24 to be received.

Although the present invention has been described in connection with details of the preferred embodiment, many alterations and modifications may be made without departing from the invention. Accordingly, it is intended that all such alterations and modifications be considered as within the spirit and scope of the invention as defined in the appended claims.

What is claimed and desired to be secured by Letters Patent is:

1. Apparatus for monitoring and controlling a remotely controlled receiver to determine the particular channel of a plurality of channels to which the remotely controlled receiver is tuned, comprising:
   means for receiving a predetermined control signal representing a viewer command transmitted from a remote control unit to said remotely controlled receiver,
   means responsive to said receiving means for interfering with the transmission of said predetermined control signal to said remotely controlled receiver,
   means responsive to said receiving means for identifying the viewer command represented by said predetermined control signal,
   means responsive to said identifying means for storing a representation of the identified viewer command, and
   means responsive to said identifying means for controlling the operation of said remotely controlled receiver.

2. The apparatus of claim 1, wherein said controlling means includes means for terminating the operation of said interference means, thereby allowing said remotely controlled receiver to receive the predetermined control signal.

3. The apparatus of claim 2, wherein said apparatus further includes means for transmitting a second control signal representative of said viewer command to said remotely controlled receiver.

4. The apparatus of claim 1, wherein said controlling means includes means for transmitting a second control signal representative of a viewer command to said remotely controlled receiver.

5. The apparatus of claim 4, wherein the viewer command represented by said second control signal is the same as the viewer command represented by said predetermined control signal.

6. The apparatus of claim 4, wherein the viewer command represented by said second control signal is not the same as the viewer command represented by said predetermined control signal.

7. The apparatus of claim 1, wherein said identifying means includes means for determining the last channel to which the remotely controlled receiver is tuned from said stored viewer command.

8. The apparatus of claim 7, wherein said controlling means periodically broadcasts a remote control signal to said remotely controlled receiver, said remote control signal instructing said remotely controlled receiver to tune to said last channel.

9. The apparatus of claim 1, wherein said receiving means includes means for filtering the interference generated by said interfering means, whereby said predetermined control signal can be processed by said identifying means.

10. The apparatus of claim 1, wherein the interfering means includes means for generating an interfering signal at the same frequency as the predetermined control signal.

11. The apparatus of claim 1, wherein the predetermined control signal is in serial data format, and the interfering means produces an interfering signal during periods of non-transmission which separate serial data transmissions, whereby the serial data format of the predetermined control signal is not readable by the remotely controlled receiver.

12. A method for determining the channel of a plurality of channels to which a remotely controlled receiver is tuned, comprising the steps of:
monitoring a transmission medium for signals,
detecting a signal transmitted in said medium,
interfering with the transmission of said signal in said transmission medium
determining whether said signal corresponds to any one of a plurality of predetermined, information containing, allowable signals,
preserving the information content of said predetermined allowable signal, and
controlling said remotely controlled receiver in accordance with the information content of said predetermined allowable signal.

13. The method of claim 12, wherein said detecting step includes filtering any interference being generated by said interfering step.

14. The method of claim 12, wherein said interfering step includes transmitting interfering signals in said transmission medium.

15. The method of claim 14 wherein the information content of said predetermined allowable signal is contained in a serial data transmission format and said interfering signals are transmitted during the period of non-transmission separating serial data transmissions, thereby altering the format of said serial data transmission.

16. The method of claim 14, wherein the interfering signal is at a frequency substantially the same as the detected signal.

17. The method of claim 14, wherein the interfering signal is at a different frequency than the detected signal.

18. The method of claim 12, wherein the step of controlling said remotely controlled receiver comprises ceasing the interfering step, thereby allowing the predetermined allowable signal to be received by said remotely controlled receiver.

19. The method of claim 18, including the further step of transmitting the predetermined allowable signal to said remotely controlled receiver.

20. The method of claim 18, including the further steps of determining the last channel to which said remotely controlled receiver is tuned from said preserved information content and periodically broadcasting a predetermined control signal to said remotely controlled receiver tuning said remotely controlled receiver to the last preserved channel.

21. The method of claim 12, wherein the step of controlling said remotely controlled receiver comprises transmitting a predetermined control signal to said remotely controlled receiver containing the information content of said predetermined allowable signal.

22. The method of claim 21, including the further step of periodically rebroadcasting said predetermined control signal to said remotely controlled receiver.

23. The method of claim 12, including the further step of continuing to interfere with the transmission of signals in said transmission medium.

24. The method of claim 12, including the further step of periodically broadcasting a predetermined control signal to said remotely controlled receiver containing the last preserved channel number to which the remotely controlled receiver is tuned.

25. The method of claim 12, wherein the transmission medium is either infrared, ultrasound, or radio frequency.

26. A system for monitoring a remotely controlled television tuner to determine the channel to which the remotely controlled television tuner is tuned, comprising:
a remote control viewer transmitter including a viewer selection keyboard which generates and transmits a predetermined remote control signal dependent on viewer keyboard selections;
a television;
a television tuner for selecting the television display;
a first remotely controlled receiver which receives the predetermined remote control signal containing the viewer selection, and forwards the viewer selection to the television tuner;
a channel detection apparatus for monitoring the channel to which the television tuner is tuned, including
a second remote control receiver which receives the predetermined remote control signal,
an interference generating device, responsive to the second remote control receiver, which generates and transmits signals which interfere with the transmission of the predetermined remote control signal to the first remotely controlled receiver,
a processing device for receiving the predetermined remote control signal from the second remote control receiver, analyzing the predetermined remote control signal to determine the viewer selection, storing said viewer selection, and determining an allowable remote control signal,
a second remote control transmitter, responsive to the processing device, for transmitting the allowable remote control signal to the first remotely controlled receiver, with sufficient power to overpower the interfering signals transmitted by the interfering device.

27. The system of claim 26, including means, in the processing device, for determining the channel to which the tuner is tuned, and for causing the second remote control transmitter to periodically broadcast that channel to the first remotely controlled receiver.

28. The system of claim 26, including means, in the processing device, for halting the transmission of the interfering signal if the predetermined remote control signal and the allowable remote control signal are identical.

* * * * *